United States Patent [19]
Hee

[11] Patent Number: 6,045,235
[45] Date of Patent: Apr. 4, 2000

[54] DC POWER SUPPY DEVICE WITH RECHARGEABLE CELLULAR TELEPHONE BATTERY IN FLASHLIGHT WITH CONNECTION FOR REMOTE ELECTRICAL DEVICE

[76] Inventor: Robert K. Hee, 1510 16th Ave., Honolulu, Hi. 96816

[21] Appl. No.: 09/027,665

[22] Filed: Feb. 23, 1998

[51] Int. Cl.⁷ ..................................................... F21L 7/00
[52] U.S. Cl. .......................... 362/183; 362/208; 362/200; 362/186; 362/88; 362/201
[58] Field of Search .................................. 362/183, 208, 362/200, 186, 88, 201

[56] References Cited

U.S. PATENT DOCUMENTS

| | | | |
|---|---|---|---|
| 4,325,107 | 4/1982 | MacLeod | 362/183 |
| 4,395,696 | 7/1983 | Menard | 340/431 |
| 5,055,986 | 10/1991 | Johnson | 362/253 |
| 5,321,349 | 6/1994 | Chang | 323/297 |
| 5,786,106 | 7/1998 | Armani | 429/98 |

*Primary Examiner*—Sandra O'Shea
*Assistant Examiner*—Ronald E. DelGizzi
*Attorney, Agent, or Firm*—Michael I. Kroll

[57] ABSTRACT

A DC power supply unit (30) comprising a flashlight (32). A rechargeable cellular telephone battery (34) is provided, having a positive terminal (36) and a negative terminal (38). The rechargeable cellular telephone battery (34) is supported in the flashlight (32). An adjustable structure (40) is in the flashlight (32) for electrically connecting the flashlight (32) to the positive terminal (36) and the negative terminal (38) of the rechargeable cellular telephone battery (34), so that the rechargeable cellular telephone battery (34) can operate the flashlight (32). A facility (42) in the flashlight (32) is for electrically connecting the rechargeable cellular telephone battery (34) to a remote electrical device, so that the rechargeable cellular telephone battery (34) can operate the remote electrical device.

5 Claims, 21 Drawing Sheets

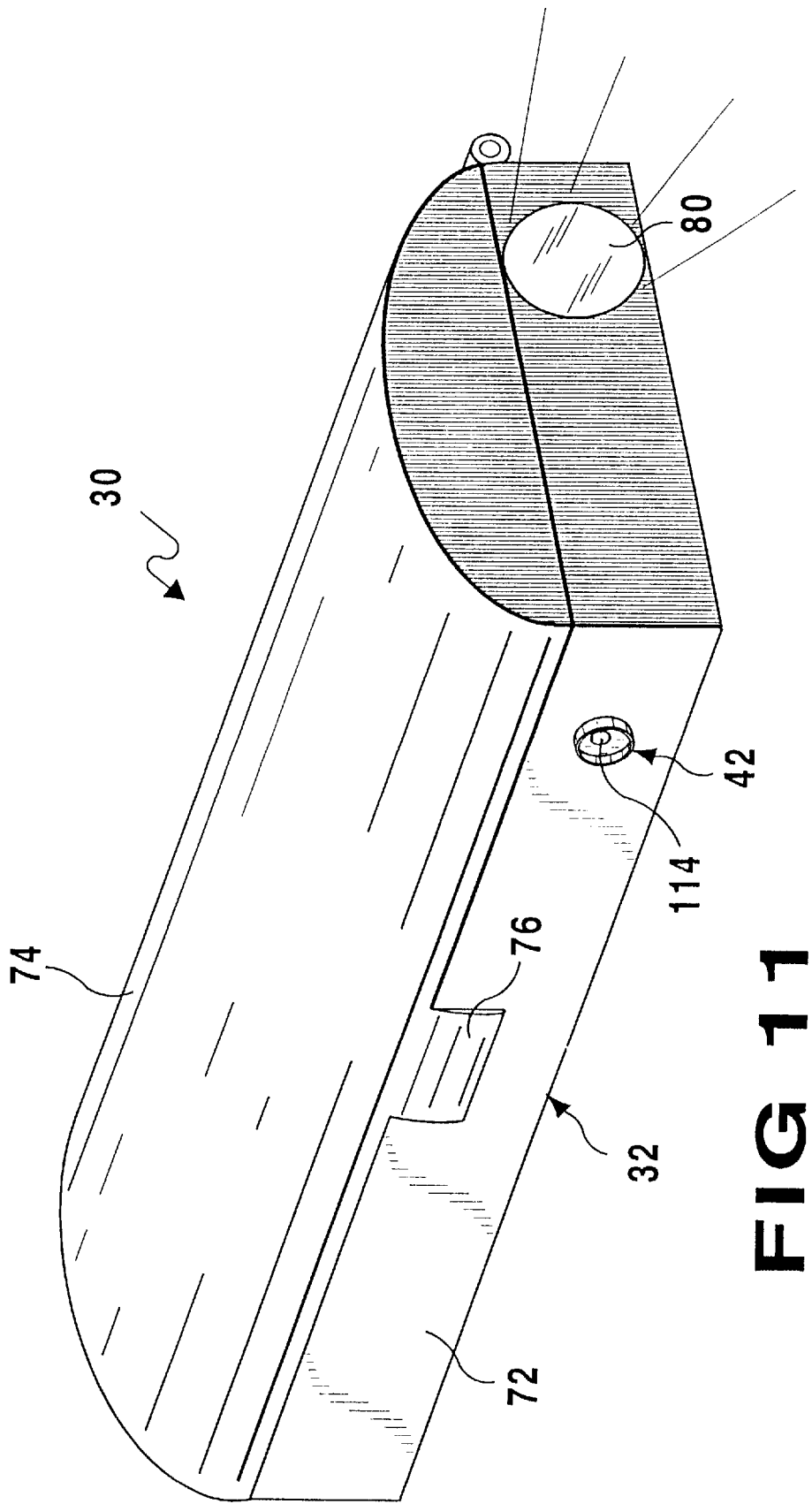

DC POWER SUPPY DEVICE WITH RECHARGEABLE CELLULAR TELEPHONE BATTERY IN FLASHLIGHT WITH CONNECTION FOR REMOTE ELECTRICAL DEVICE

BACKGROUND OF THE INVENTION

1. Field of the Invention

The instant invention relates generally to rechargeable battery systems and more specifically it relates to a DC power supply unit. The DC power supply unit is a flashlight with internal adjustable positive and negative contacts, so that the flashlight can be operated by any type of rechargeable cellular telephone battery placed therein. The flashlight contains exterior terminals or a jack which allows for an electrical connection between the rechargeable cellular telephone battery and other remote electrical devices.

2. Description of the Prior Art

Numerous rechargeable battery systems have been provided in prior art. For example, U.S. Pat. No. 4,325,107 to MacLeod; U.S. Pat. No. 4,395,696 to Menard; U.S. Pat. No. 5,055,986 to Johnson and U.S. Pat. No. 5,321,349 to Chang all are illustrative of such prior art. While these units may be suitable for the particular purpose to which they address, they would not be as suitable for the purposes of the present invention as heretofore described.

U.S. Pat. No. 4,325,107 discloses improved rechargeable flashlight having a casing of dielectric material including adapter means for recharging the batteries from a power source such as a battery in a vehicle. The adapter means includes a phono plug terminal mating with a phono jack in the flashlight's casing wall and a terminal plug for insertion into a conventional cigarette lighter receptacle on a vehicle's dashboard. The terminal plug has a current limiting resistor in the charging circuit to provide a safe charging voltage and current to the rechargeable batteries in the flashlight. Preferably an LED (light emitting diode) is in the charging circuit to indicate charging current is being received from the charging source and accepted by the flashlight batteries. Further included is an integral cross-member within the flashlight casing serving as a fixed partition between the batteries in the flashlight casing and the flashlight bulb thereby isolating the bulb against shock impact from battery movement. An on-off switch mechanism comprises an internal bus bar which is movable fore and aft in the flashlight casing and has at one end an electrical connection to the photo plug socket in the flashlight casing wall. At its other end a continuous electrical contact with a metal sleeve is attached to the interior wall of the casing. A flexible spare bulb holder is insertable in the flashlight's rear end cap. This invention relates to an improvement in rechargeable flashlights.

U.S. Pat. No. 4,395,696 discloses a portable, lightweight and inexpensive emergency power pack to be hooked up to the lighting system of a vehicle trailer, such as a semi-trailer, camper, mobile home or the like, for the purpose of flashing all or some trailer lights on and off while the trailer is unhitched on the side of a rod, so as to warn passing motorists of its presence. The device includes a battery, an on-off switch, a flasher and an illuminating light. The case for supporting the battery and other components is made of a unitary, molded plastic piece, and includes a cylindrical housing on one side thereof, that contains an adapter plug for connecting to a mating plug in the vehicle trailer. Auxiliary warning lights may also be strung from a special connector on the unit, while an alternate embodiment may be utilized in the shop to test the various electrical systems on the trailers.

U.S. Pat. No. 5,055,986 discloses a combination light, radio and clock which is designed for operation on two types of batteries, one of which is supplied by conventional alternating current. The device includes a cabinet or housing designed for mounting on a wall or resting on a flat surface, with an incandescent light, a radio and a clock mounted therein. The light, clock and radio may be utilized during normal operating periods by conventional alternating current which is converted to direct current by a transformer and during emergencies by a rechargeable battery, as well as one or more replaceable, rechargeable or non-rechargeable batteries.

U.S. Pat. No. 5,321,349 discloses a rechargeable/portable multi-voltage DC power supply includes an Ni—Cd rechargeable battery set connected to a switching power supply converting circuit, a pulse width modulation circuit, and a filter circuit for providing a regulated output voltage from the filter circuit. A button switch cooperates with a selection circuit and a feedback ratio circuit for selecting a specific output voltage from a plurality of available output voltages. A plurality of light emitting diodes are connected to the selection circuit for indicating the value of the output voltage.

SUMMARY OF THE INVENTION

An object is to provide a DC power supply unit that is a flashlight with internal adjustable positive and negative contacts, so that the flashlight can be operated by any type of rechargeable cellular telephone battery placed therein.

An additional object is to provide a DC power supply unit in which the flashlight contains exterior terminals or a jack, which allows for an electrical connection between the rechargeable cellular telephone battery and other remote electrical devices.

A further object is to provide a DC power supply unit that is simple and easy to use.

A still further object is to provide a DC power supply unit that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 11 is a front perspective view of a second embodiment of the present invention.

Similar reference characters denote corresponding features consistently throughout the attached drawings.

DETAILED DESCRIPTION OF THE PREFERRED EMBODIMENTS

Figure 1:
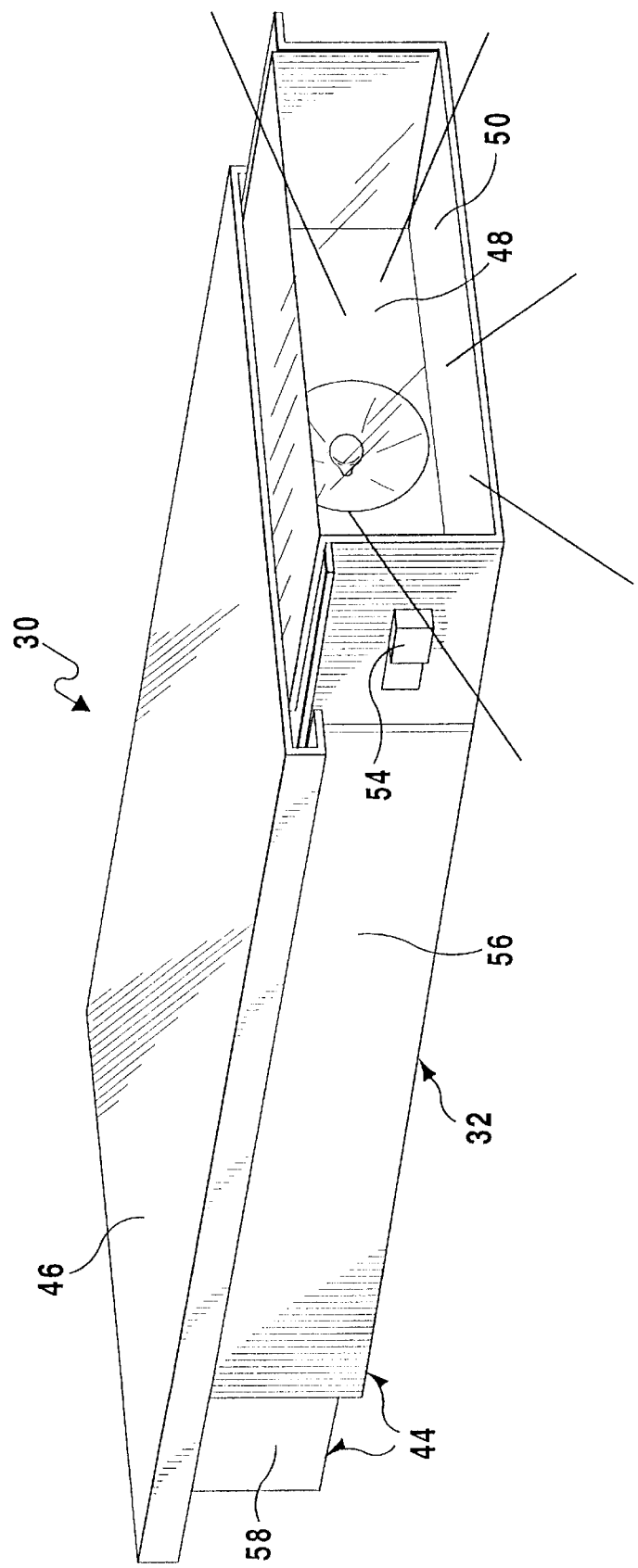
FIG. 1 is a front perspective view of a first embodiment of the present invention.
Figure 2:
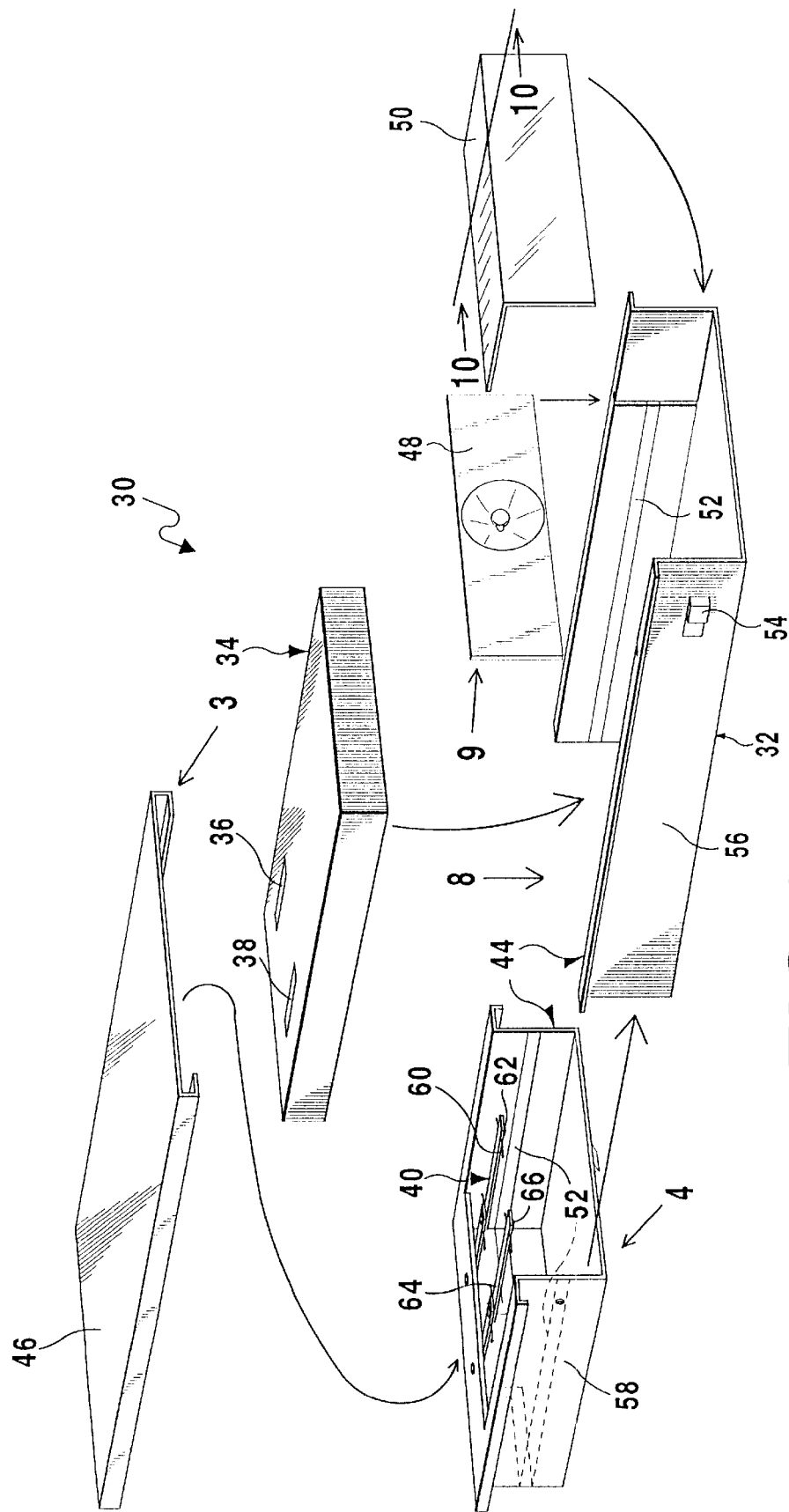
FIG. 2 is an exploded front perspective view of the first embodiment.
Figure 3:
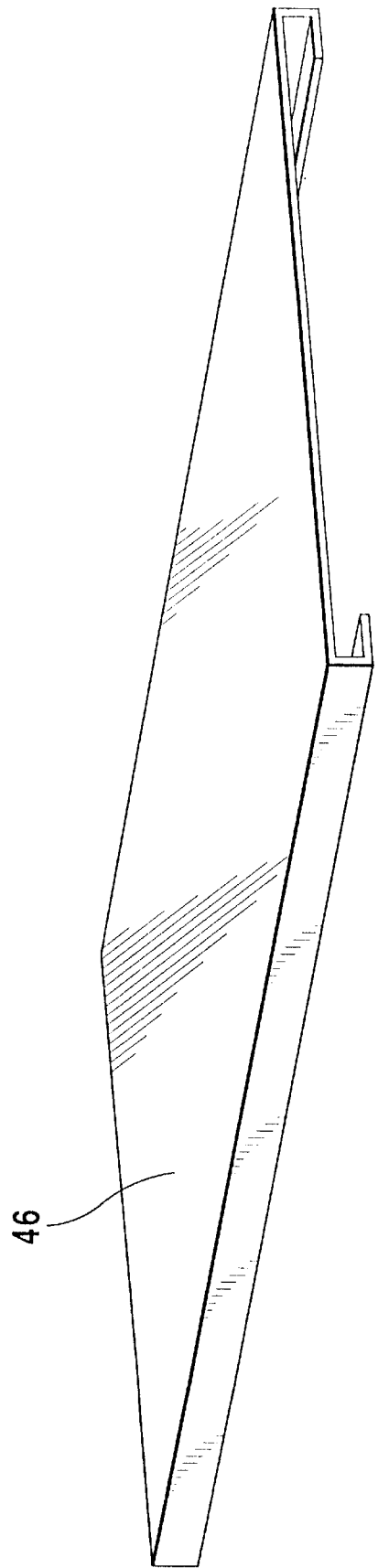
FIG. 3 is an enlarged front perspective view of the cover, as indicated by arrow 3 in FIG. 2.
Figure 4:
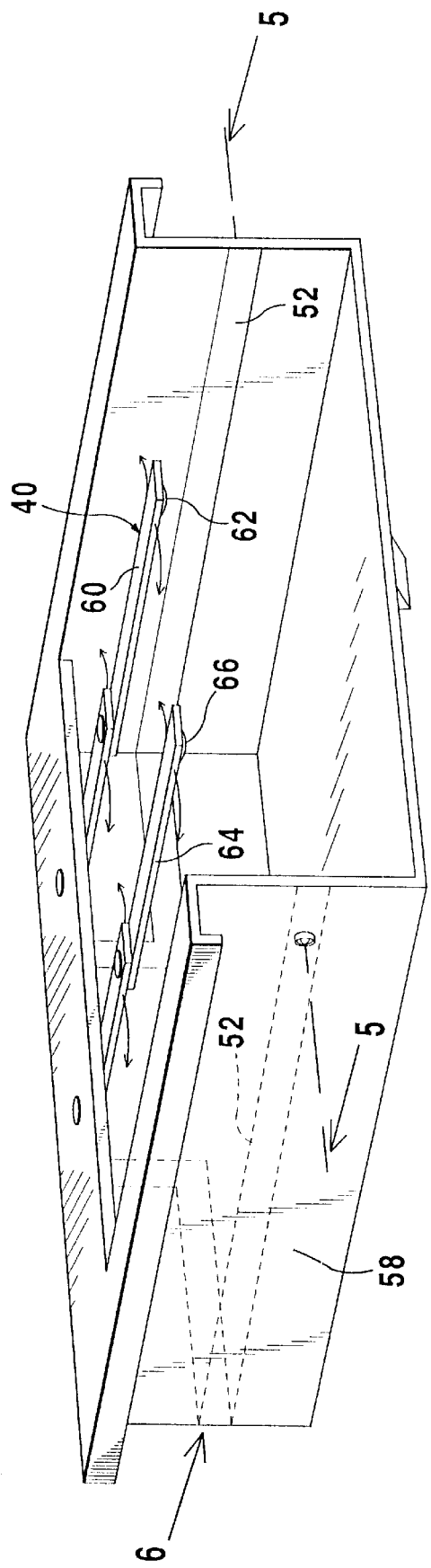
FIG. 4 is an enlarged front perspective view of the rear slide member of the housing, as indicated by arrow 4 in FIG. 2.
Figure 5:
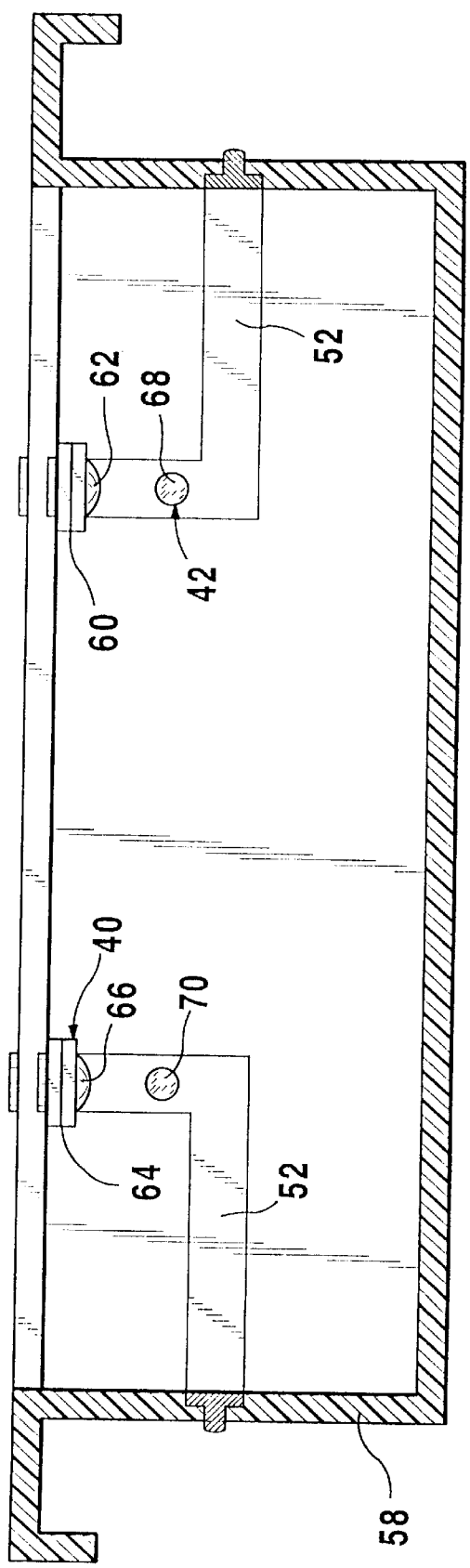
FIG. 5 is a cross sectional view, taken along line 5—5 in FIG. 4.

Turning now descriptively to the drawings, in which similar reference characters denote similar elements throughout the several views, FIGS. 1 through 28 illustrate the present invention being a DC power supply unit 30. With regard to the reference numerals used, the following numbering is used throughout the various drawing figures.

30 DC power supply unit
32 flashlight of 30
34 rechargeable cellular telephone battery of 30
36 positive terminal of 34
38 negative terminal of 34
40 electrically connecting adjustable structure of 30
42 remote electrically connecting facility of 30
44 housing of 32
46 cover of 32
48 light panel of 32
50 lens cap of 32
52 electric circuit of 32
54 switch of 32
56 U-shaped stationary member of 44
58 rear slide member of 44
60 positive adjustable contact arm of 40
62 positive contact point on 60
64 negative adjustable contact arm of 40
66 negative contact point on 64
68 positive external screw terminal of 42
70 external screw terminal of 42
72 housing of 32
74 lid of 32
76 latch mechanism of 32
78 light assembly of 32
80 lens of 32
82 electric circuit of 32
84 switch of 32
86 track assembly of 40
88 positive electrical strip on 86
90 negative electrical strip on 86
92 positive contact clip of 40
94 positive contact point on 92
96 negative contact clip of 40
98 negative contact point on 96
100 horizontal member of 86
102 positive vertical member of 86
104 top hook end on 102
106 first spring biased plunger in 102
108 negative vertical member of 86
110 top hook end on 108
112 second spring biased plunger in 108
114 jack for 42

DC power supply unit 30 comprises a flashlight 32. A rechargeable cellular telephone battery 34 is provided having a positive terminal 36 and a negative terminal 38. The rechargeable cellular telephone battery 34 is supported in the flashlight 32. An adjustable structure 40 is in the flashlight 32 for electrically connecting the flashlight 32 to the positive terminal 36 and the negative terminal 38 of the rechargeable cellular telephone battery 34, so that the rechargeable cellular telephone battery 34 can operate the flashlight 32. A facility 42 in the flashlight 32 is for electrically connecting the rechargeable cellular telephone battery 34 to a remote electrical device, so that the rechargeable cellular telephone battery 34 can operate the remote electrical device.

The flashlight 32, as shown in FIGS. 1 through 10 includes a housing 44 to receive the rechargeable cellular telephone battery 34. A cover 46 engages with the housing 44. A light panel 48 is mounted near a forward end of the housing 44. A lens cap 50 is affixed at the forward end of the housing 44 in front of the light panel 48. An electrical circuit 52 in the housing 44 extends between the electrically connecting adjustable structure 40 and the light panel 48. A switch 54 on the housing 44 is connected to the electric circuit 52 to selectively energize the light panel 48.

The housing 44 consists of a U-shaped stationary member 56 and a rear slide member 58, which locks into the U-shaped stationary member 56. The rear slide member 58 carries the electrically connecting adjustable structure 40 thereon.

The electrically connecting adjustable structure 40 comprises a positive adjustable contact arm 60, having a positive contact point 62 at a forward end. The positive adjustable contact arm 60 is pivotally mounted at a rearward end to the rear slide member 58 of the housing 44. It electrically extends to the electric circuit 52 and extends over the rechargeable cellular telephone battery 34 to be moved, so that the positive contact point 62 will engage with the positive terminal 36 of the rechargeable cellular telephone battery 34. A negative adjustable contact arm 64 has a negative contact point 66 at a forward end. The negative adjustable contact arm 64 is pivotally mounted at a rearward end to the rear slide member 58 of the housing 44. It is electrically connected to the electric circuit 52 and extends over the rechargeable cellular telephone battery 34 to be moved, so that the negative contact point 66 will engage with the negative terminal 38 of the rechargeable cellular telephone battery 34.

Figure 6:
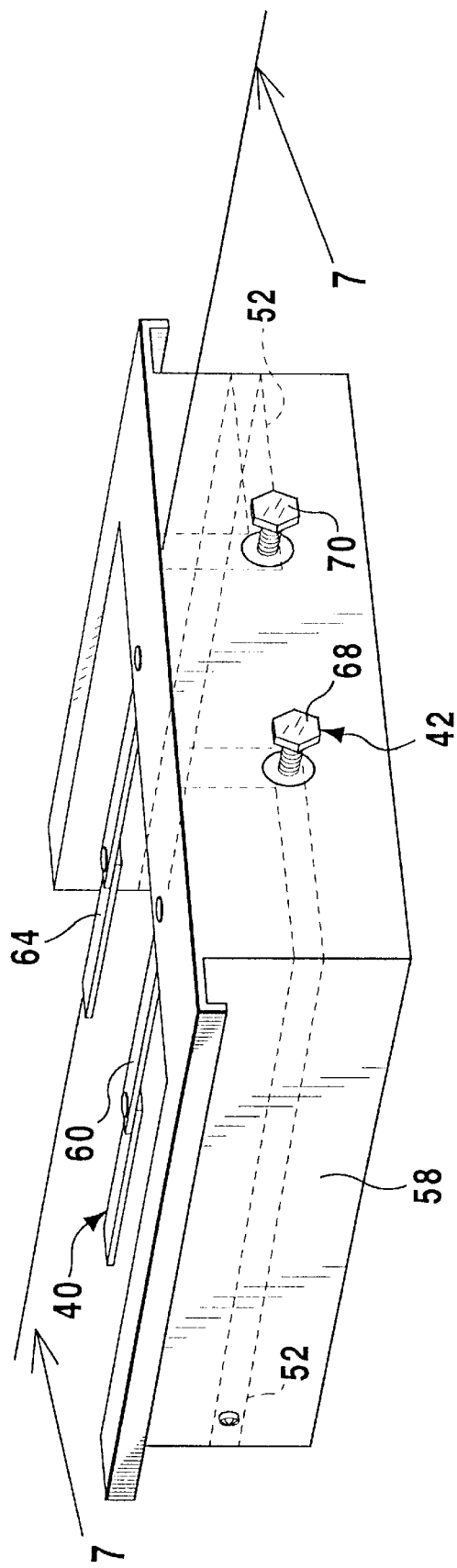
FIG. 6 is a rear perspective view, taken in the direction of arrow 6 in FIG. 4.
Figure 7:
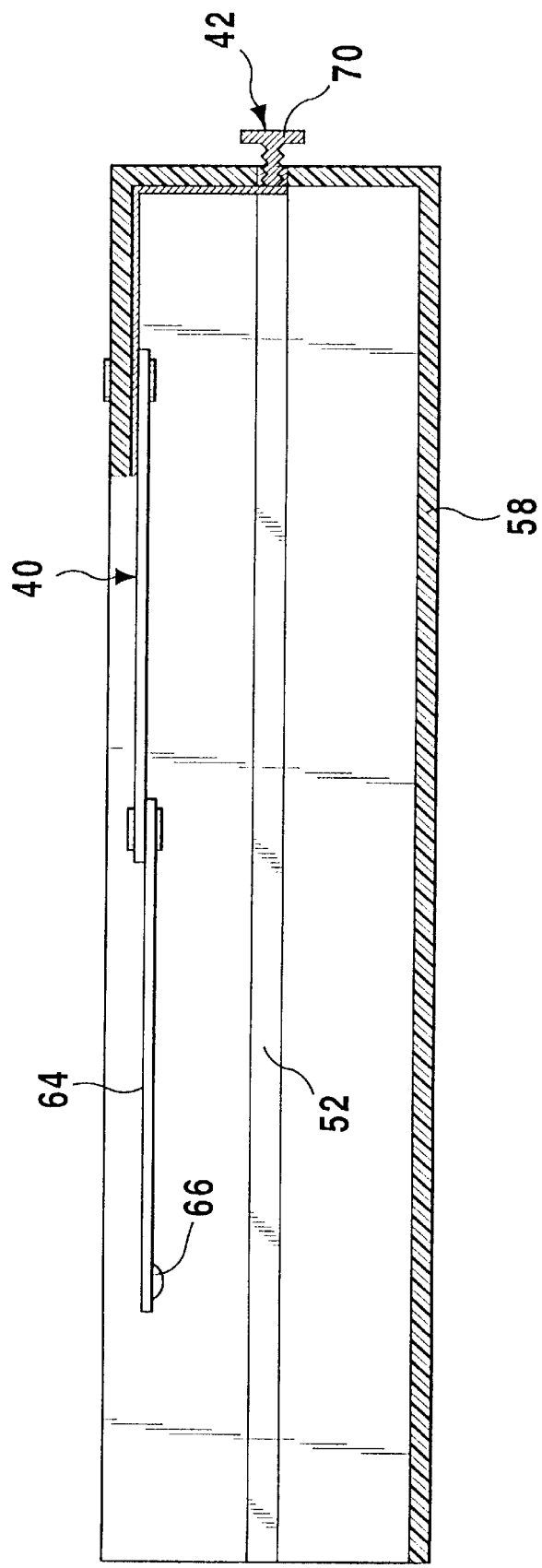
FIG. 7 is a cross sectional view, taken along line 7—7 in FIG. 6.
Figure 8:
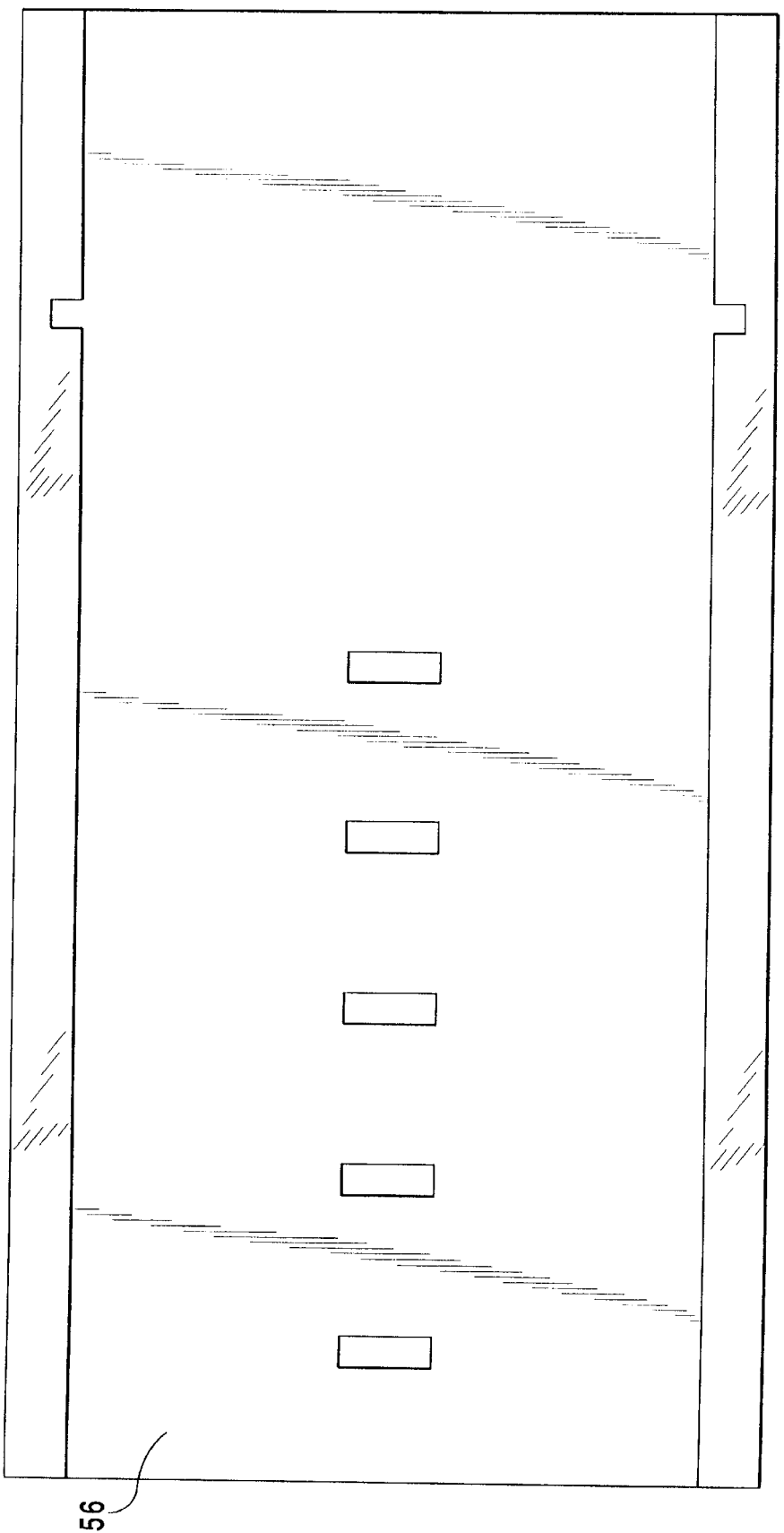
FIG. 8 is a top plan view of the U-shaped stationary member of the housing, taken in the direction of arrow 8 in FIG. 2.
Figure 10:
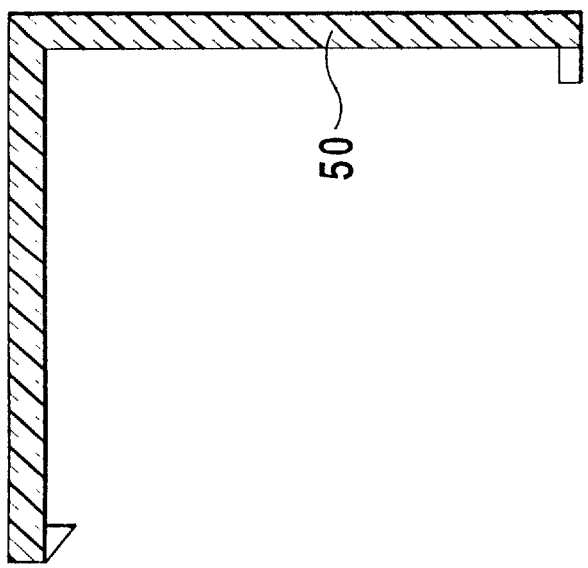
FIG. 10 is a cross sectional view of the lens cap, taken along line 10—10 in FIG. 2.
Figure 9:
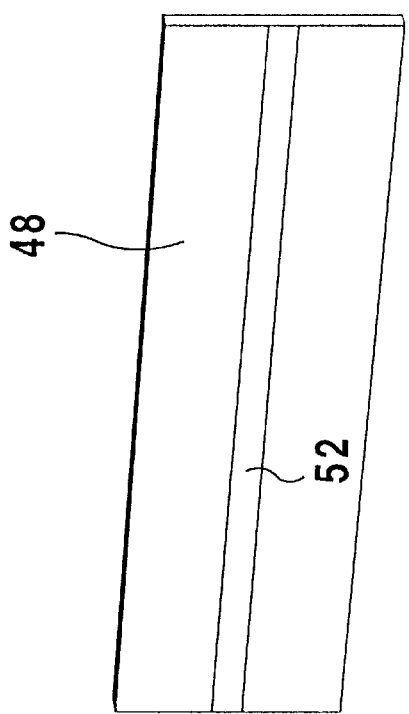
FIG. 9 is a rear perspective view of the light panel, taken in the direction of arrow 9 in FIG. 2.
Figure 12:
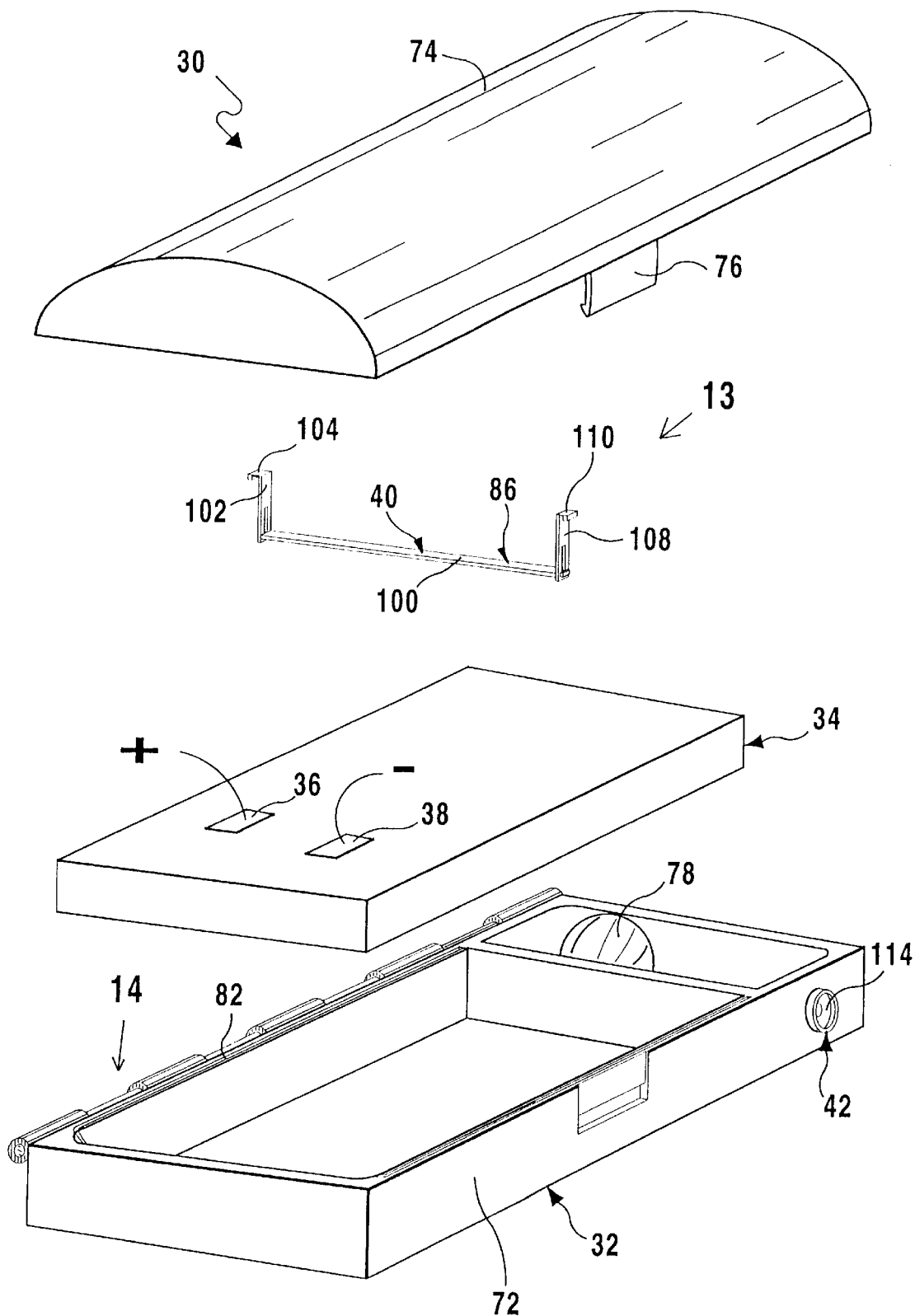
FIG. 12 is an exploded rear perspective view of the second emubodimnent.
Figure 13:
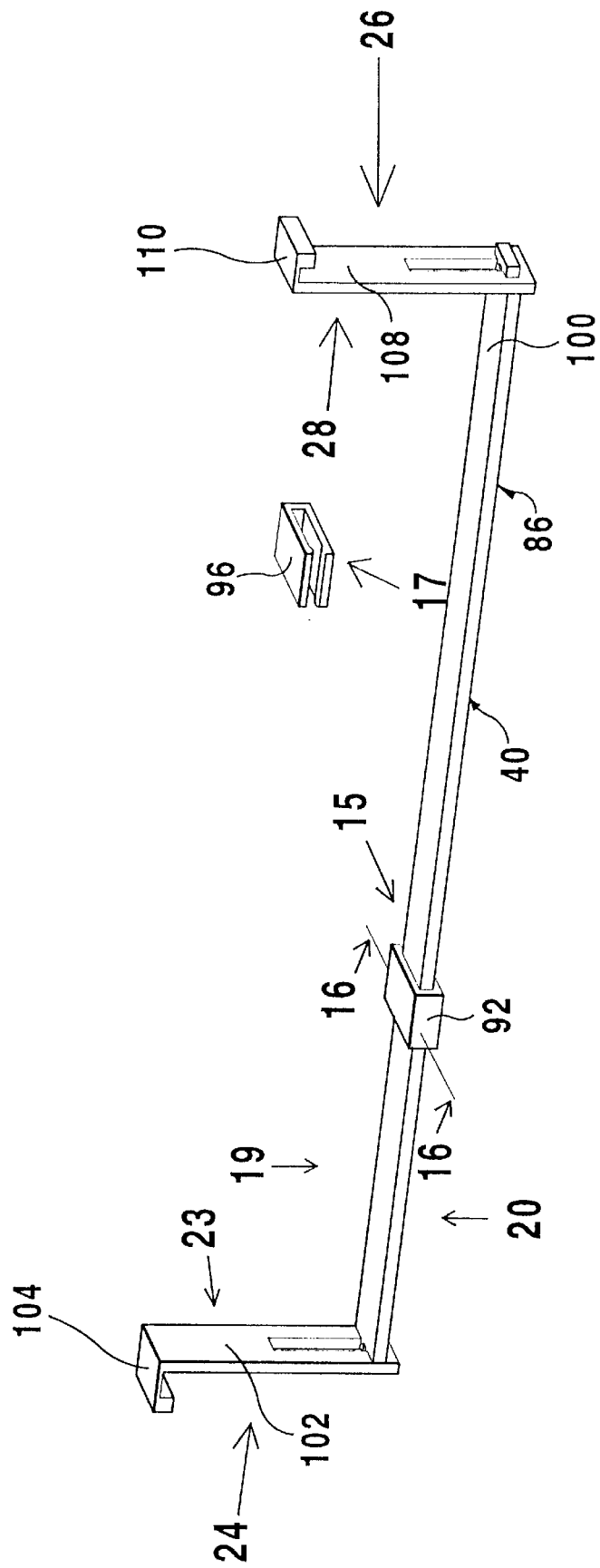
FIG. 13 is an enlarged rear perspective view of the track assembly with the positive and negative contact clips, as indicated by arrow 13 in FIG. 12.
Figure 14:
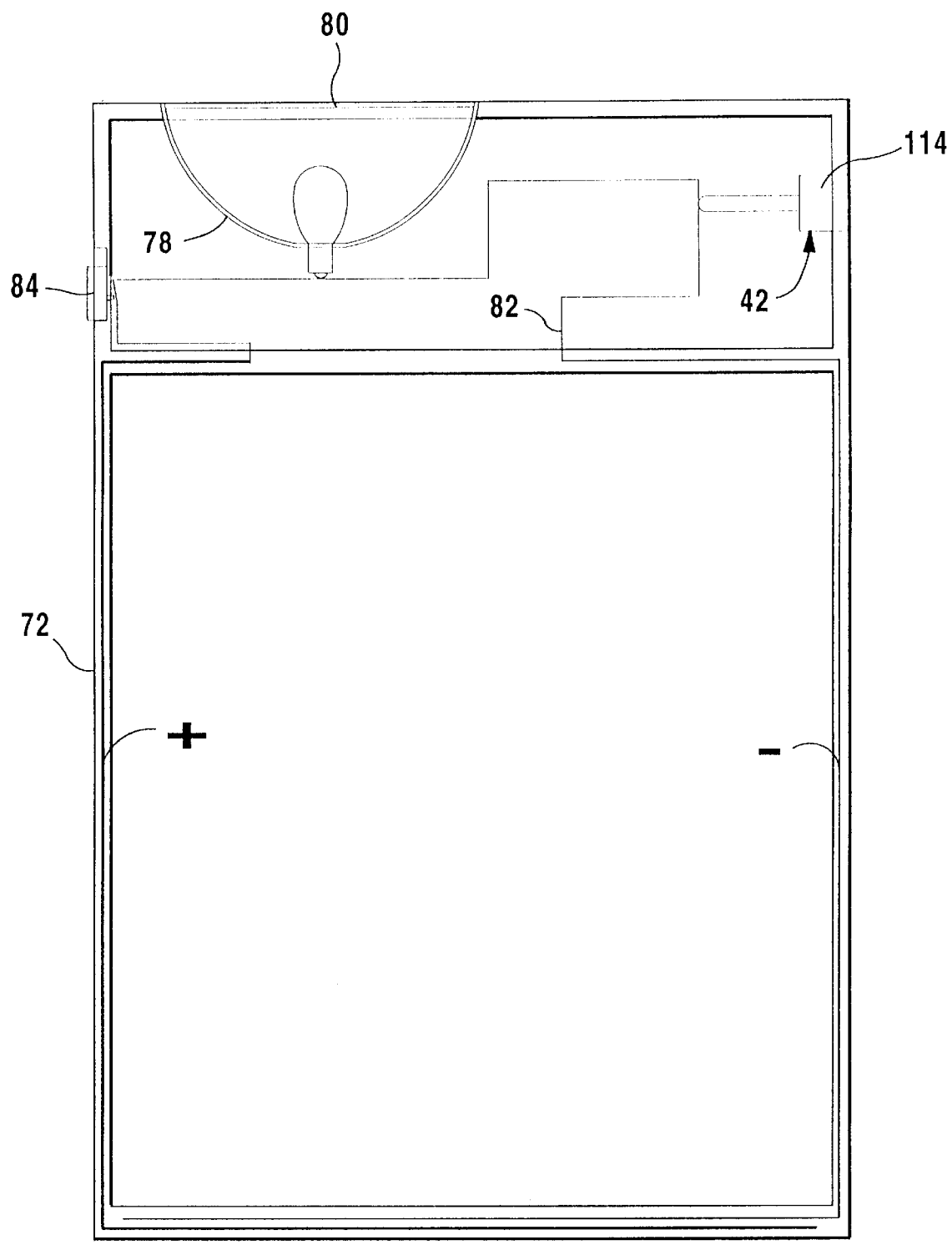
FIG. 14 is an enlarged diagrammatic top plan view of the housing, taken in the direction of arrow 14 in FIG. 12.
Figure 15:
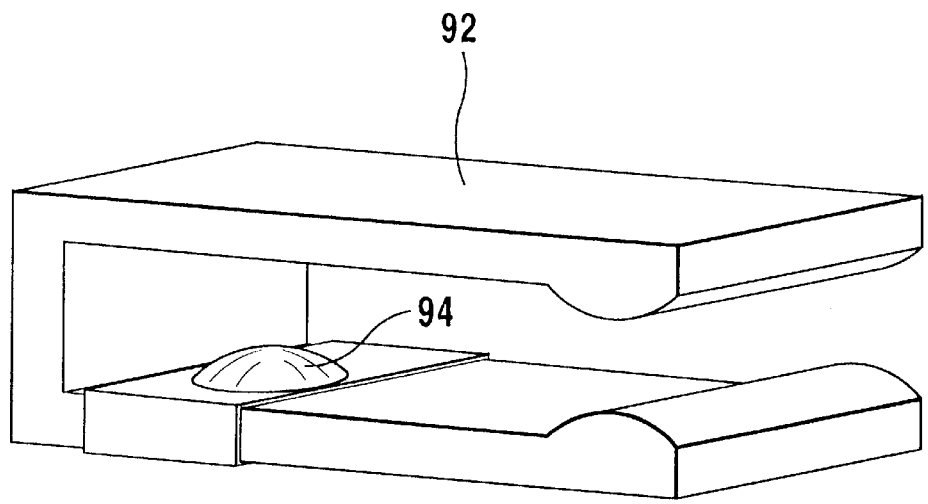
FIG. 15 is a further enlarged perspective view of the positive contact clip, taken in the direction of arrow 15 in FIG. 13.
Figure 16:
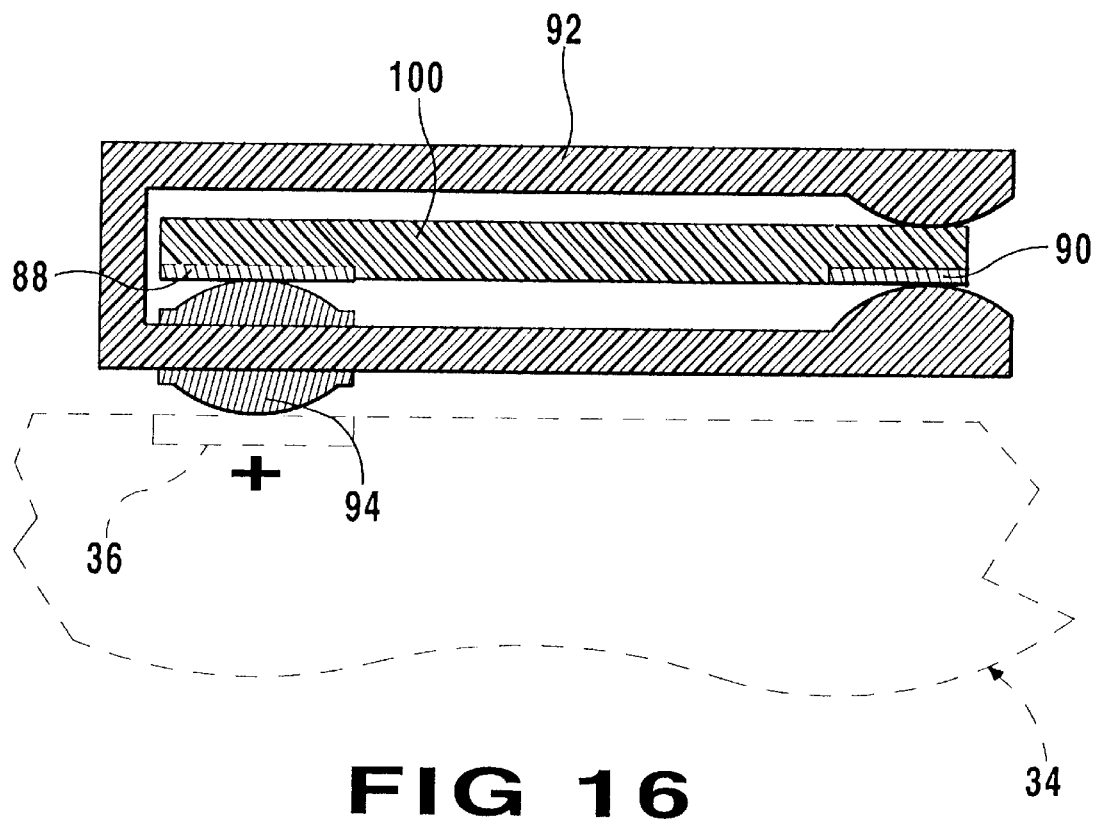
FIG. 16 is a further enlarged cross sectional view taken along line 16—16 in FIG. 13.
Figure 17:
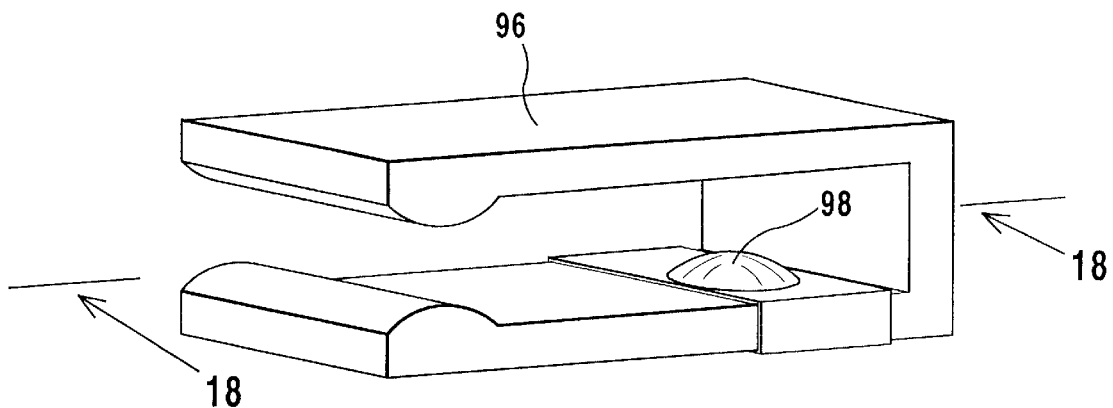
FIG. 17 is a further enlarged perspective view of the negative contact clip, taken in the direction of arrow 17 in FIG. 13.
Figure 18:
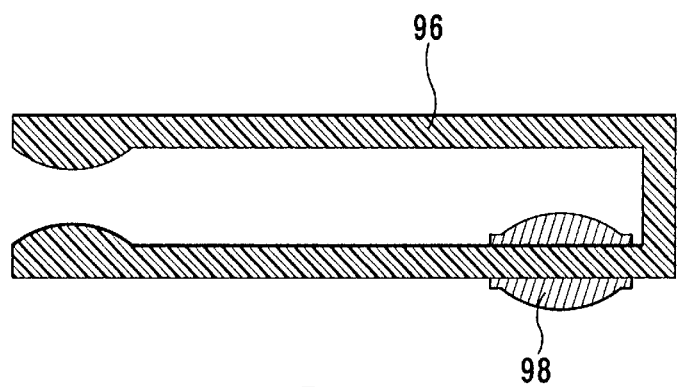
FIG. 18 is a cross sectional view taken along line 18—18 in FIG. 17.
Figures 19, 20:
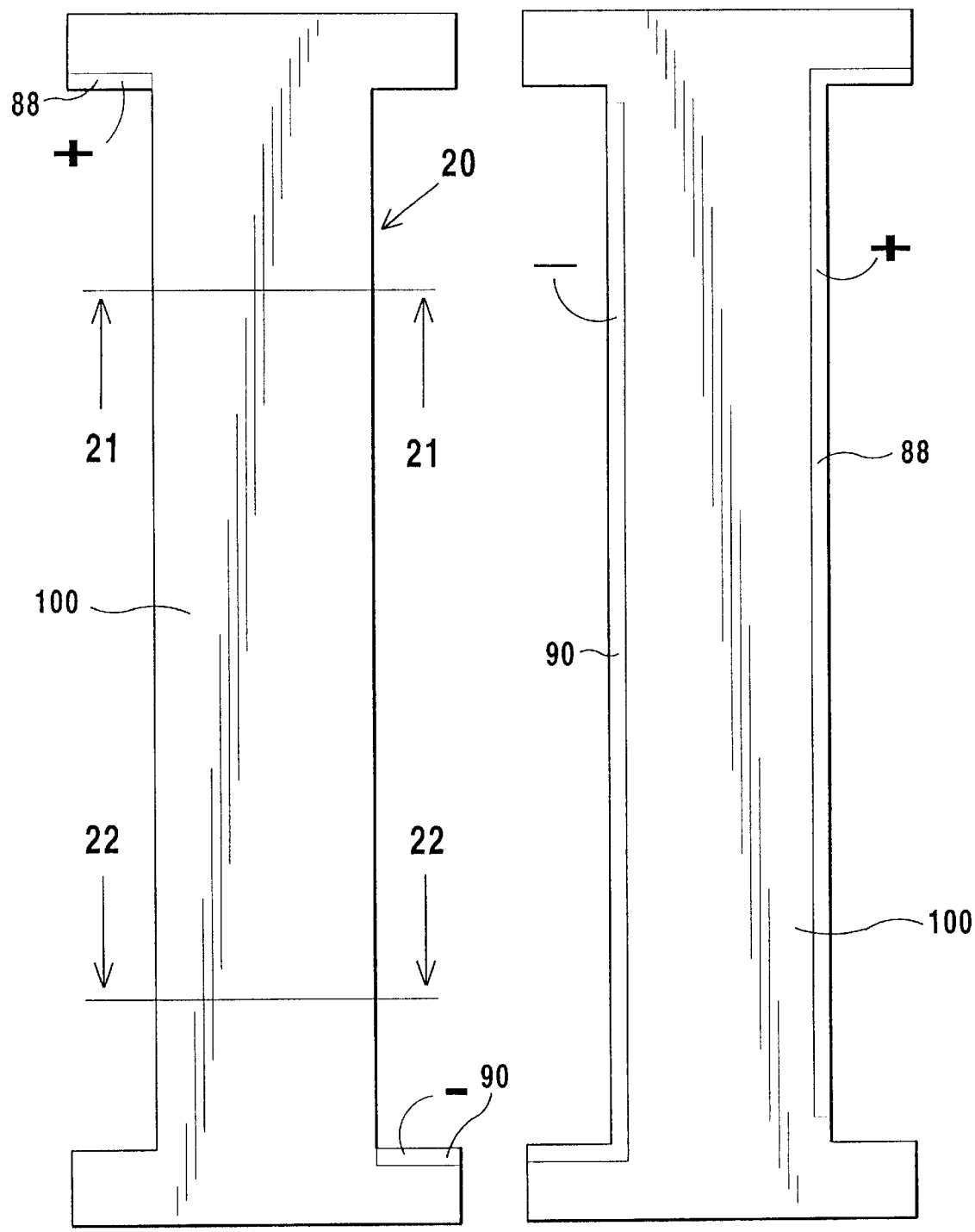
FIG. 19 is a further enlarged top plan view of the horizontal member of the track assembly, taken in the direction of arrow 20 in FIG. 13.
FIG. 20 is a further enlarged bottom plan view of the horizontal member of the track assembly, taken in the direction of arrow 20 in FIG. 13.
Figure 21:
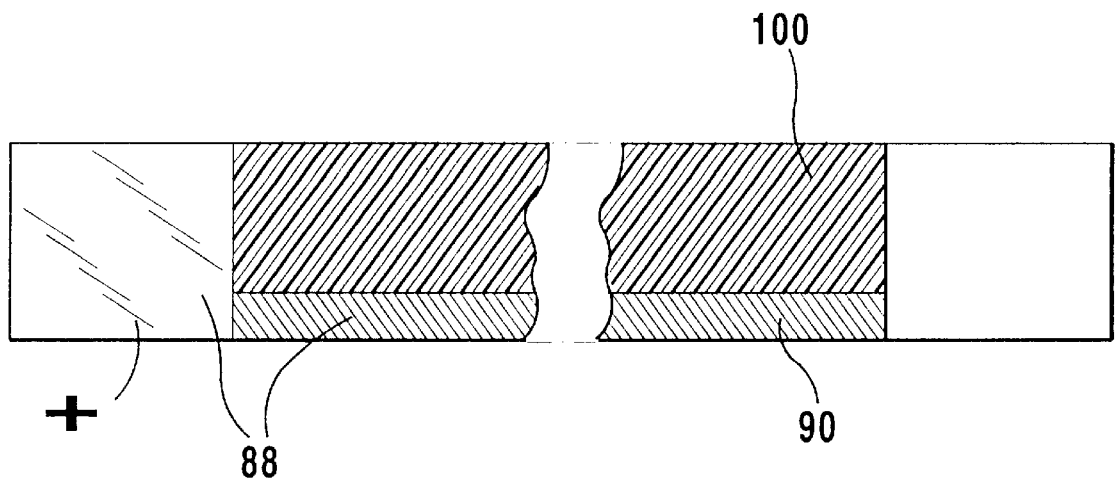
FIG. 21 is still a further enlarged cross sectional view, taken along line 21—21 in FIG. 19.
Figure 22:
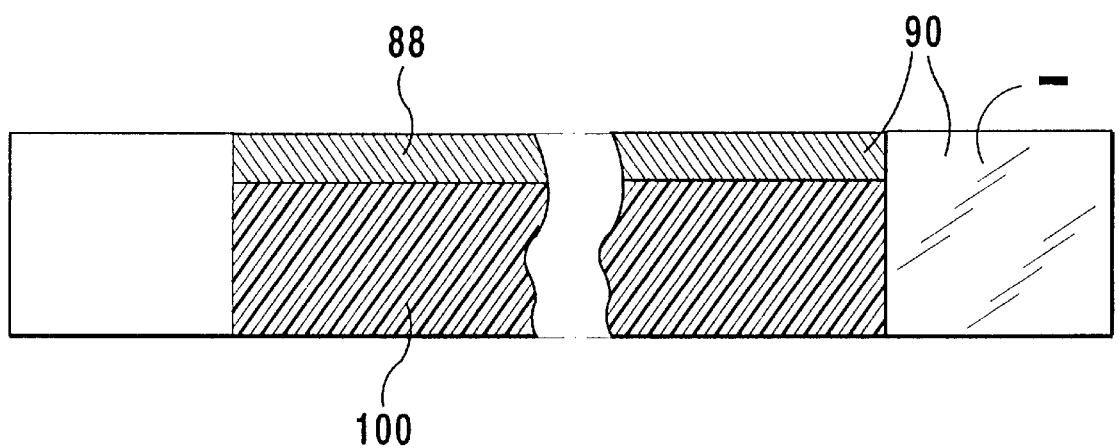
FIG. 22 is a still further enlarged cross sectional view, taken along line 22—22 in FIG. 19.
Figure 23:
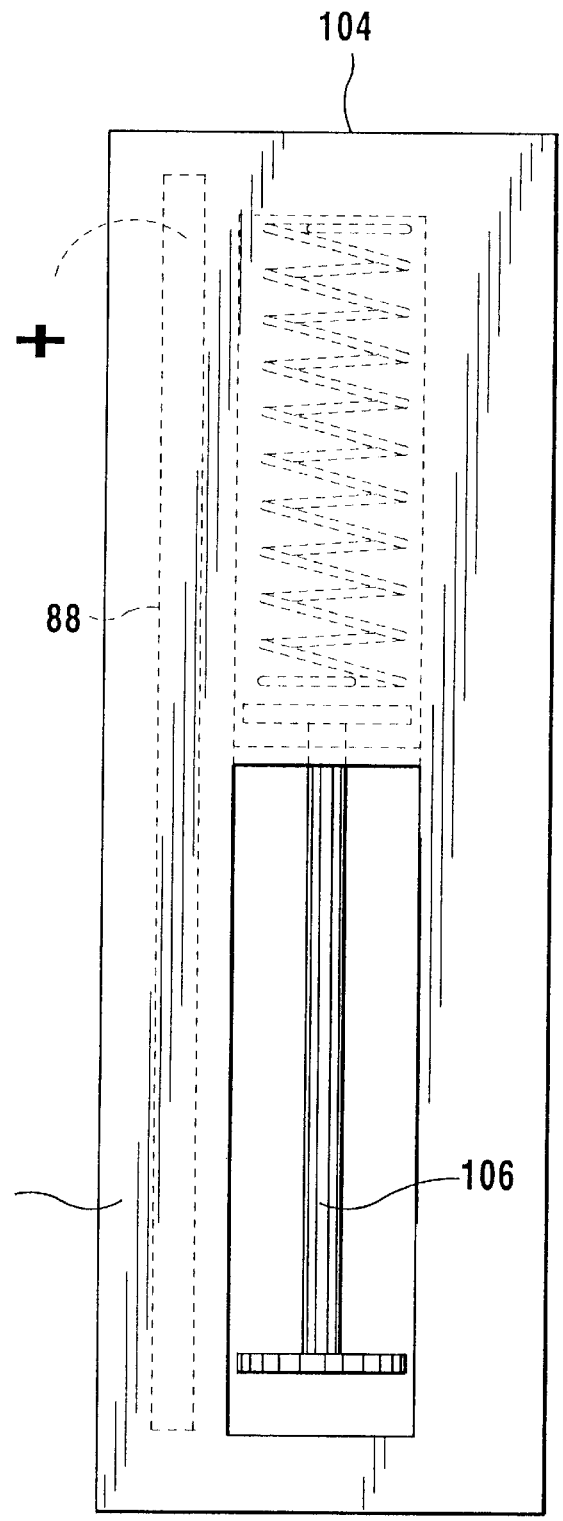
FIG. 23 is a further enlarged rear elevational view of the positive vertical member of the track assembly, taken in the direction of arrow 23 in FIG. 13.
Figure 24:
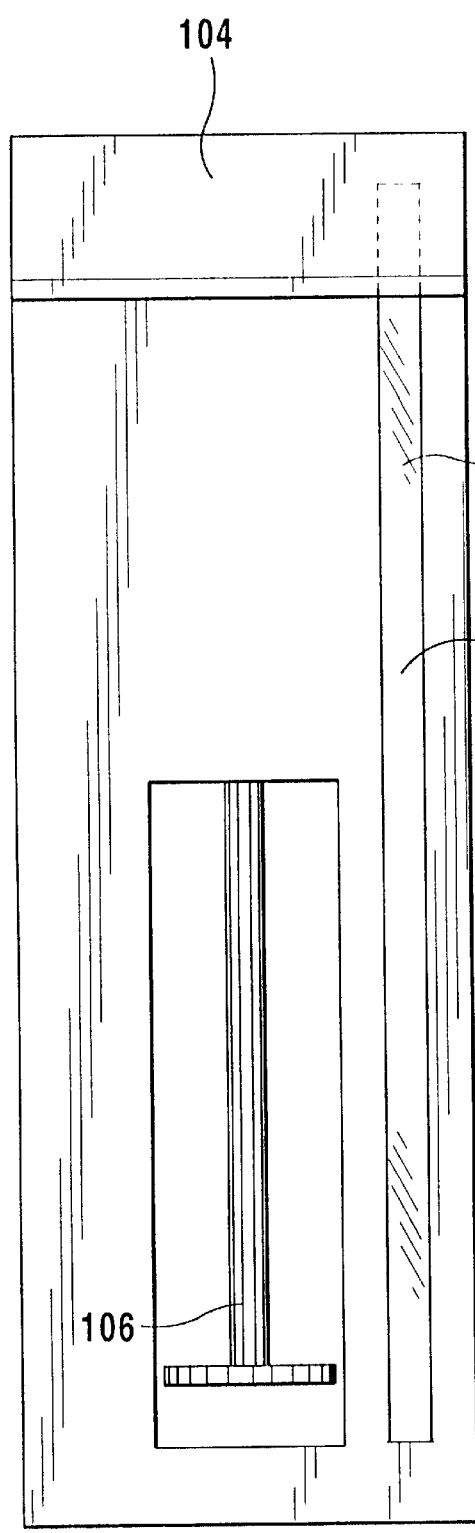
FIG. 24 is a further enlarged front elevational view of the positive vertical member of the track assembly, taken in the direction of arrow 24 in FIG. 13.
Figure 25:
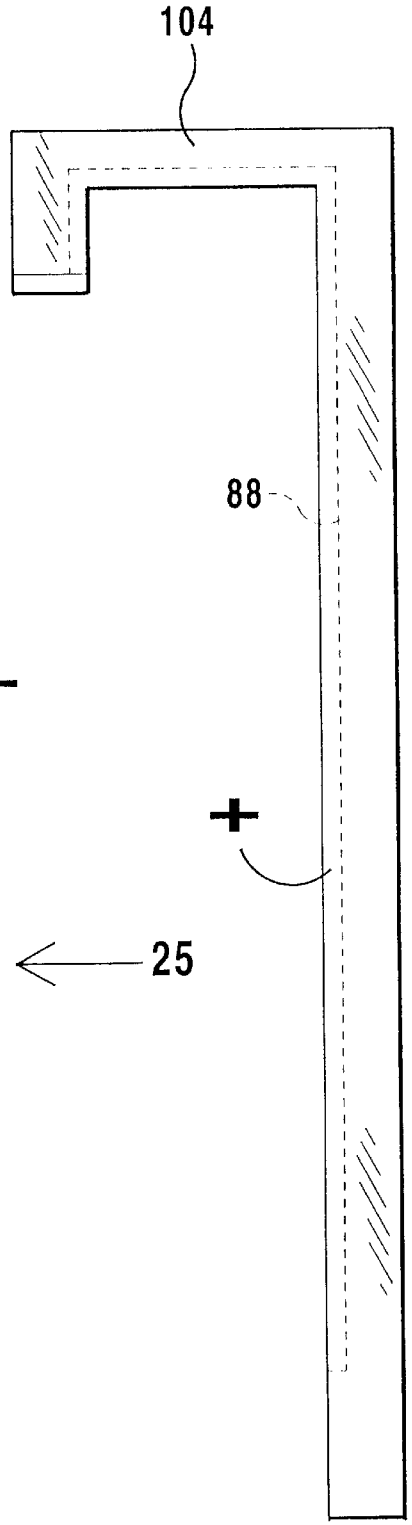
FIG. 25 is a side elevational view, taken in the direction of arrow 25 in FIG. 24.
Figure 26:
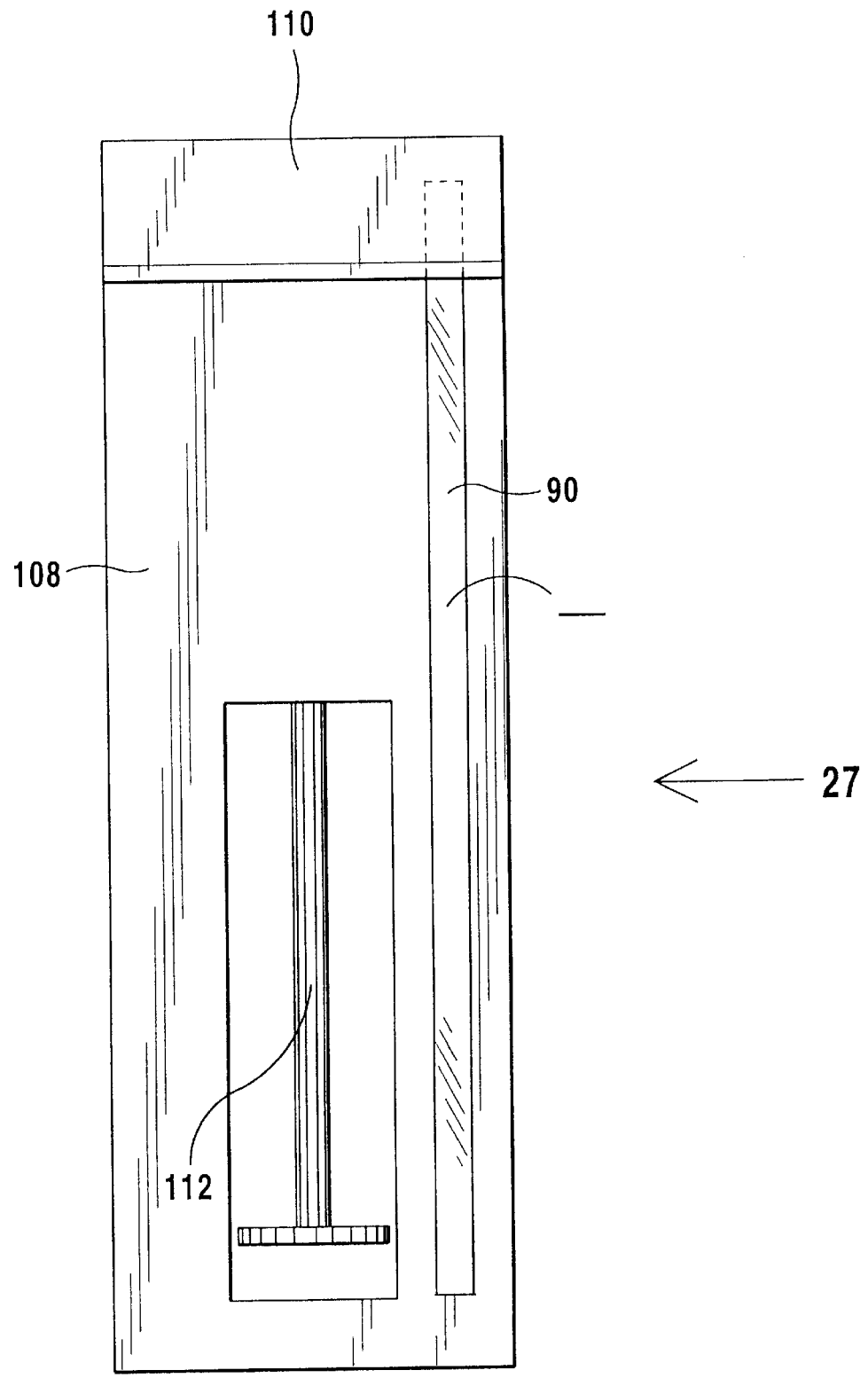
FIG. 26 is a further enlarged front elevational view of the negative vertical member of the track assembly, taken in the direction of arrow 26 in FIG. 13.
Figure 27:
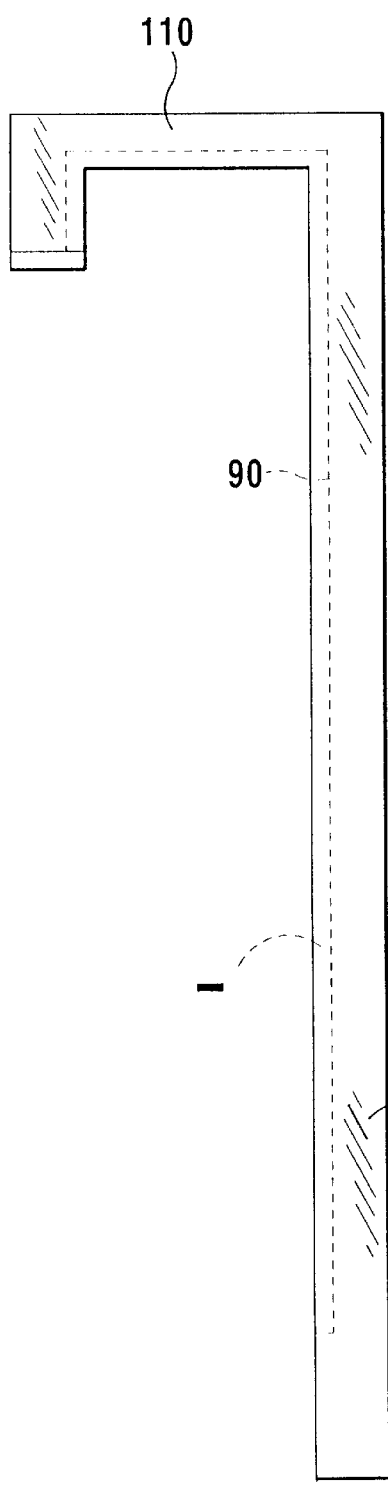
FIG. 27 is a side elevational view, taken in the direction of arrow 27 in FIG. 26.
Figure 28:
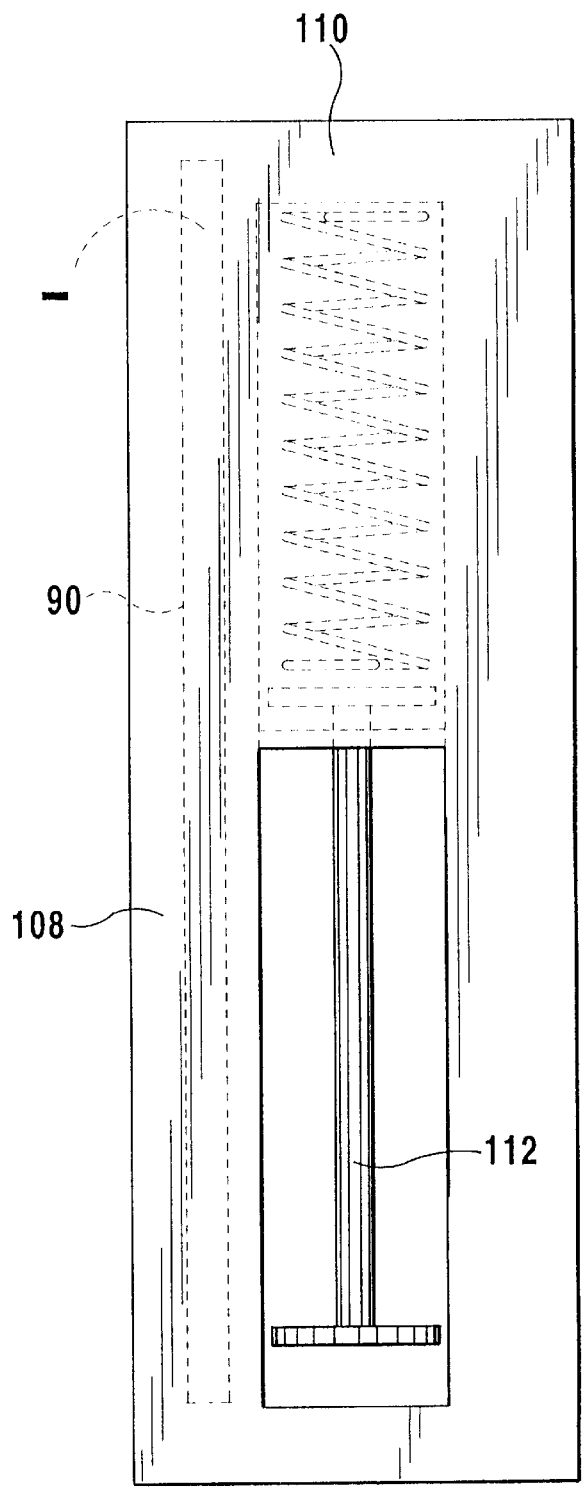
FIG. 28 is a further enlarged rear elevational view of the negative vertical member of the track assembly, taken in the direction of arrow 28 in FIG. 13.

The remote electrically connecting facility 42, as best seen in FIG. 6, includes a positive external screw terminal 68 threaded into the rear slide member 58 of the housing 44 and is electrically connected to the electric circuit 52. A negative external screw terminal 70 is threaded into the rear slide member 58 of the housing 44 and is electrically connected to the electric circuit 52.

The flashlight 32, as shown in FIGS. 11 through 28, includes a housing 72 to receive the rechargeable cellular telephone battery 34. A lid 74 is hinged at a first side of the housing 72. A latch mechanism 76 on the lid 74 at a second side of the housing 72 keeps the lid 74 closed on the housing 72. A light assembly 78 is carried in a forward end of the housing 72. A lens 80 is mounted in the forward end of the housing 72 in front of the light assembly 78. An electric circuit 82 in the housing 72 extends between the electrically connecting adjustable structure 40 and the light assembly 78. A switch 84 on the housing 72 is connected to the electric circuit 82 to selectively energize the light assembly 78.

The electrically connecting adjustable structure 40 includes a track assembly 86 adjustably carried within the housing 72. The track assembly 86 has a positive electrical strip 88 and a negative electrical strip 90 thereon, to engage with the electric circuit 82 in the housing 72. A positive contact clip 92 has a positive contact point 94, to slide upon the track assembly 86 to engage with the positive electrical strip 88 and the positive terminal 36 of the rechargeable cellular telephone battery 34. A negative contact clip 96 has a negative contact point 98, to slide upon the track assembly 86 to engage with the negative electrical strip 90 and the negative terminal 38 of the rechargeable cellular telephone battery 34.

The track assembly 86 consists of a horizontal member 100 having a portion of the positive electrical strip 88 and a portion of the negative electrical strip 90 extending therealong. A positive vertical member 102 has a portion of the positive electrical strip 88 thereon and a top hook end 104 to engage with the electrical circuit 82 in the housing 72. A first spring biased plunger 106 is in the positive vertical member 102 to help firmly interlock a lower end of the positive vertical member 102 to a first end of the horizontal member 100, with the portions of the positive electrical strip 88 contacting each other.

A negative vertical member 108 has a portion of the negative electrical strip 90 thereon and a top hook end 110, to engage with the electrical circuit 82 in the housing 72. A second spring biased plunger 112 is in the negative vertical member 108 to help firmly interlock a lower end of the negative vertical member 108 to a second end of the horizontal member 100, with the portions of the negative electrical strip 90 contacting each other. The remote electrically connecting facility 42 is a jack 114 in the housing 72 electrically connected to the electric circuit 82, so that a plug from the remote electrical device can engage with the jack 114.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A DC power supply unit comprising:
   a) a flashlight;
   b) a rechargeable cellular telephone battery having a positive terminal and a negative terminal, said rechargeable cellular telephone battery supported in said flashlight;
   c) adjustable means in said flashlight for electrically connecting said flashlight to said positive terminal and said negative terminal of said rechargeable cellular telephone battery, so that said rechargeable cellular telephone battery can operate said flashlight;
   d) said flashlight including a housing to receive said rechargeable telephone battery, a cover to engage with said housing a light panel mounted near a forward end of said housing, a lens cap affixed at the forward end of said housing in front of said light panel, an electrical circuit in said housing extending between said electrically connecting adjustable means and said light panel, and a switch mounted on the outside of said housing for selectively completing or opening said electrical circuit;
   e) means in said flashlight for electrically connecting said rechargeable cellular telephone battery to a remote electrical device through said electric circuit for permitting said rechargeable cellular telephone battery to operate the remote electrical device when said switch closes said electrical circuit;

f) said housing further including a U-shaped stationary member and a rear slide member which locks into said U-shaped stationary member with said rear slide member carrying said adjustable means thereon; and g) said electrically connecting adjustable means comprising a positive adjustable contact arm having a positive contact point at a forward end, said positive adjustable contact arm being pivotally mounted at a rearward end to said rear slide member of said housing and electrically connected to said electric circuit and extending over said rechargeable battery with said positive contact point engaging said positive terminal of said rechargeable battery, and a negative adjustable contact arm spaced from and parallel to said positive contact arm having a negative contact point at a forward end, said negative adjustable contact arm being pivotally mounted at a rearward end to said rear slide member of said housing and electrically connected to said electrical circuit extending over said rechargeable cellular telephone battery with said negative contact point engaging said negative terminal of said rechargeable battery.

2. A DC power supply unit as recited in claim 1, wherein said remote electrically connecting means includes:

a) a positive external screw terminal threaded into said rear slide member of said housing and electrically connected to said electric circuit; and b) a negative external screw terminal threaded into said rear slide member of said housing and electrically connected to said electric circuit.

3. A DC power supply unit comprising:

a) a flashlight;

b) a rechargeable cellular telephone battery having a positive terminal and a negative terminal, said rechargeable cellular telephone battery supported in said flashlight;

c) adjustable means in said flashlight for electrically connecting said flashlight to said positive terminal and said negative terminal of said rechargeable cellular telephone battery, so that said rechargeable cellular telephone battery can operate said flashlight;

d) said flashlight including a housing to receive said rechargeable cellular telephone battery, a lid hinged at a first side of said housing, a latch mechanism on said lid at a second side of said housing to keep said lid closed on said housing, a light assembly carried in a forward end of said housing, a lens mounted in the forward end of said housing in front of said light assembly, and an electric circuit in said housing extending between said electrically connecting adjustable means and said light assembly;

e) a switch mounted on said housing for selectively completing or opening said electrical circuit;

f) means in said flashlight for electrically connecting said rechargeable cellular telephone battery through said electrical circuit in said housing to a remote electrical device so that said rechargeable cellular telephone battery can operate the remote electrical device when said switch closes said electrical circuit; and g) said electrically connecting adjustable means comprising a track assembly adjustably carried within said housing, said track assembly having a positive electrical strip and a negative electrical strip thereon to engage with said electric circuit in said housing, a positive contact clip having a positive contact point to slide upon said track assembly to engage with said positive electrical strip and said positive terminal of said rechargeable cellular telephone battery, and a negative contact clip having a negative contact point to slide upon said track assembly to engage with said negative electrical strip and said negative terminal of said rechargeable cellular telephone battery.

4. A DC power supply unit as recited in claim 3, wherein said remote electrically connecting means is a jack in said housing electrically connected to said electric circuit, so that a plug from the remote electrical device can engage with said jack.

5. A DC power supply unit as recited in claim 3, wherein said track assembly includes:

a) a horizontal member having a portion of said positive electrical strip and a portion of said negative electrical strip extending therealong;

b) a positive vertical member having a portion of said positive electrical strip thereon and a top hook end to engage with said electrical circuit in said housing;

c) a first spring biased plunger in said positive vertical member to help firmly interlock a lower end of said positive vertical member to a first end of said horizontal member, with said portions of said positive electrical strip contacting each other;

d) a negative vertical member having a portion of said negative electrical strip thereon and a top hook end to engage with said electrical circuit in said housing; and e) a second spring biased plunger in said negative vertical member to help firmly interlock a lower end of said negative vertical member to a second end of said horizontal member, with said portions of said negative electrical strip contacting each other.

* * * * *